United States Patent
Barone et al.

(10) Patent No.: US 9,279,509 B2
(45) Date of Patent: Mar. 8, 2016

(54) VALVE WITH PRECISION MOUNTED HINGE PIN POSTS

(71) Applicant: Hamilton Sundstrand Corporation, Windsor Locks, CT (US)

(72) Inventors: Michael R. Barone, Amston, CT (US); Bartosz Solarz, Otmuchow (PL)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 186 days.

(21) Appl. No.: 14/021,502

(22) Filed: Sep. 9, 2013

(65) Prior Publication Data

US 2015/0068612 A1  Mar. 12, 2015

(51) Int. Cl.
*F16K 1/22* (2006.01)
*F16K 15/03* (2006.01)

(52) U.S. Cl.
CPC ......... *F16K 15/038* (2013.01); *Y10T 137/0491* (2015.04); *Y10T 137/7839* (2015.04)

(58) Field of Classification Search
CPC .. F16K 15/03; F16K 15/038; Y10T 137/7839
USPC ............... 137/315.17, 315.22, 315.33, 512.1, 137/527; 251/284, 286, 305
See application file for complete search history.

(56) References Cited

U.S. PATENT DOCUMENTS

| | | | |
|---|---|---|---|
| 3,678,958 A * | 7/1972 | Satterwhite et al. | 137/512.1 |
| 3,965,926 A * | 6/1976 | Buckner | 137/512.1 |
| 4,694,853 A * | 9/1987 | Goodwin | 137/512.1 |
| 4,825,902 A | 5/1989 | Helms | |
| 4,977,926 A * | 12/1990 | Hocking | 137/512.1 |
| 5,246,032 A * | 9/1993 | Muddiman | 137/512.1 |
| 5,310,005 A | 5/1994 | Dollison | |
| 5,715,572 A | 2/1998 | Steinberg | |
| 6,715,731 B1 | 4/2004 | Post et al. | |
| 7,954,509 B2 | 6/2011 | Dulay et al. | |
| 8,181,669 B2 | 5/2012 | Dehais et al. | |
| 8,726,930 B2 * | 5/2014 | Barone | 137/512.1 |
| 2009/0032120 A1 * | 2/2009 | Sugai et al. | 137/527 |
| 2010/0236650 A1 | 9/2010 | Stredel | |
| 2012/0234408 A1 | 9/2012 | Tornquist et al. | |

FOREIGN PATENT DOCUMENTS

EP  2249068 A2  11/2010
WO  WO2008/129394 A1  10/2008

* cited by examiner

*Primary Examiner* — John K Fristoe, Jr.
*Assistant Examiner* — Reinaldo Sanchez-Medina
(74) *Attorney, Agent, or Firm* — Kinney & Lange, P.A.

(57) ABSTRACT

A valve includes a housing with a flow passage and a hole extending into the housing; a post with a base and a hole extending into the base, the post connected to the housing; and a dowel pin which sits in the hole of the housing and extends into the hole in the post.

14 Claims, 6 Drawing Sheets

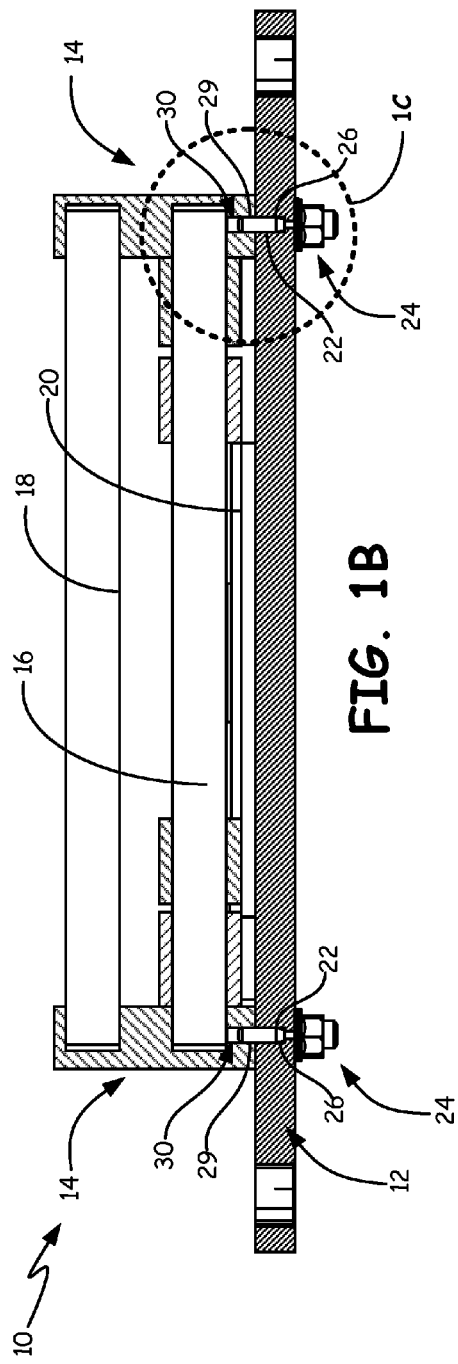
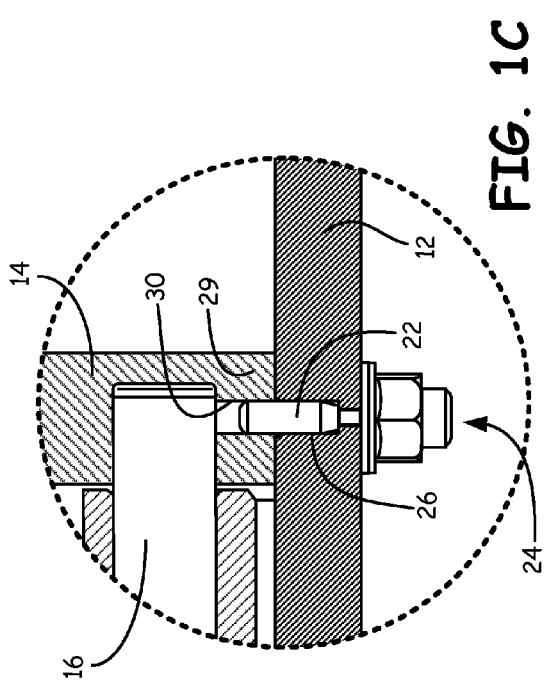

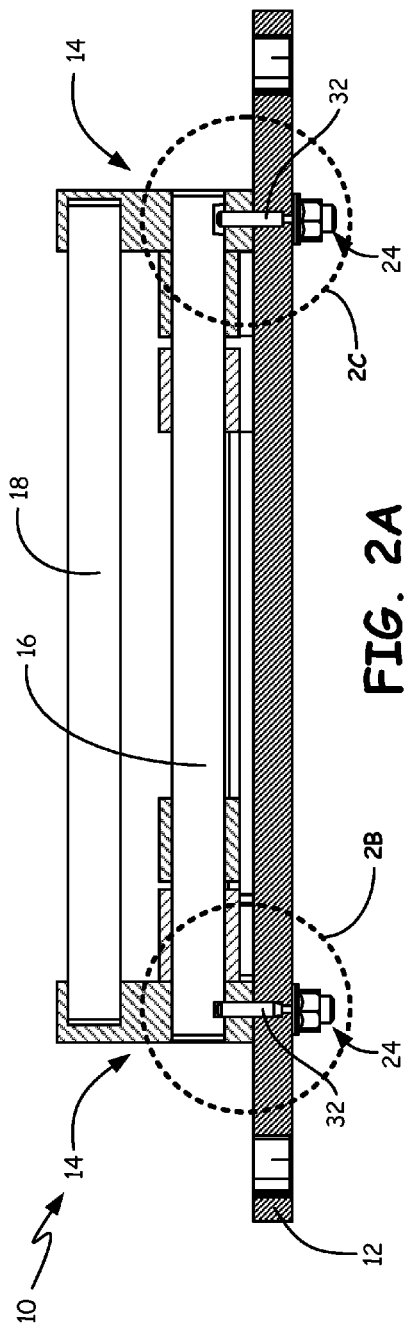
FIG. 2A
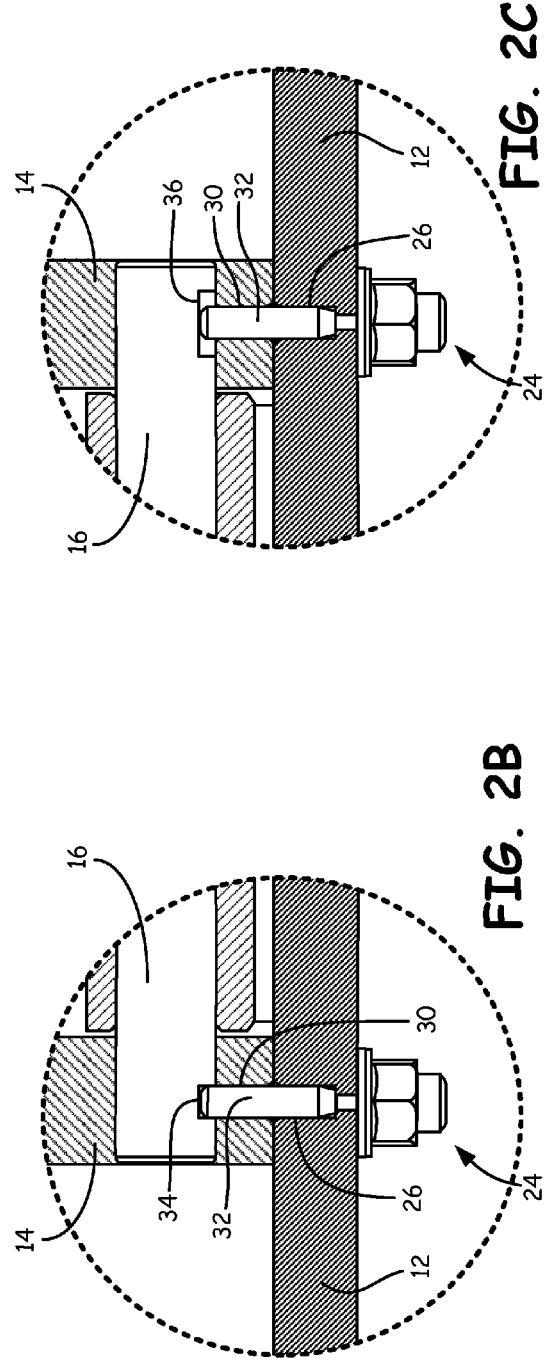
FIG. 2B
FIG. 2C

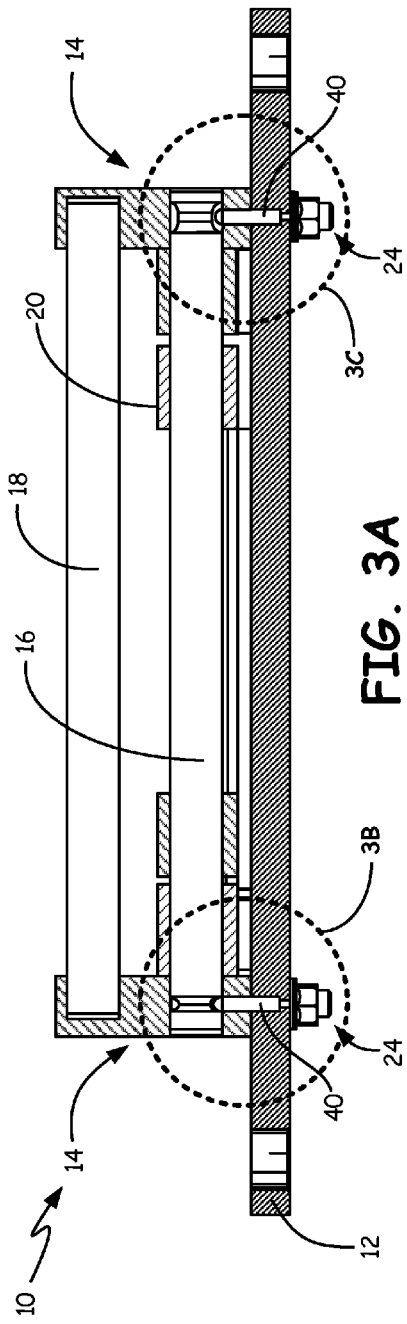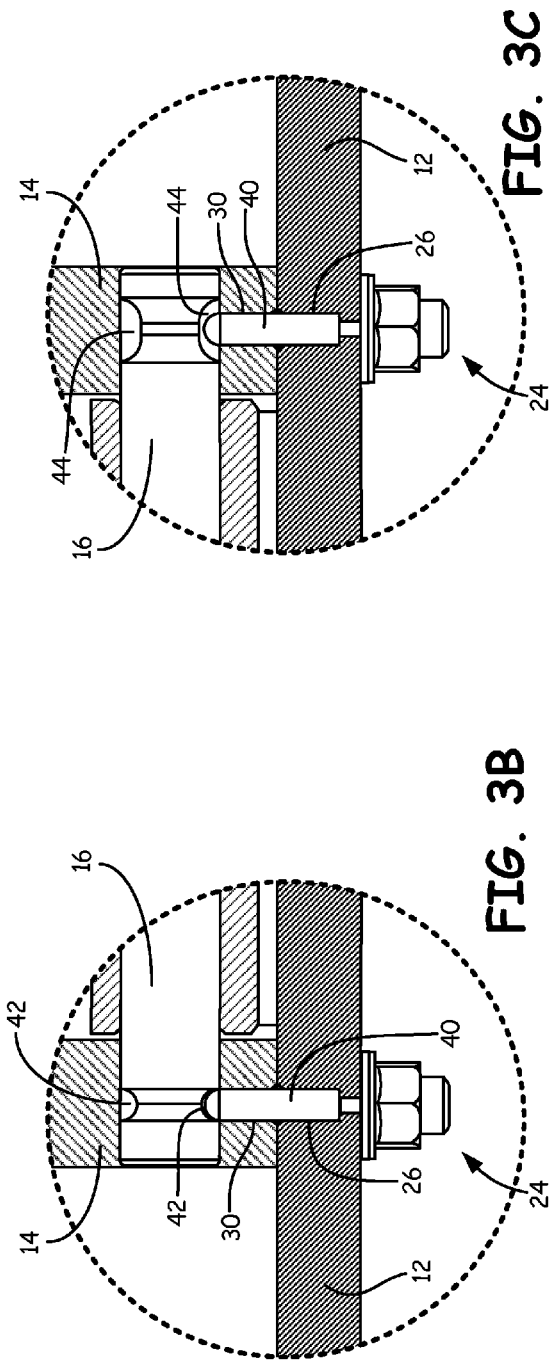

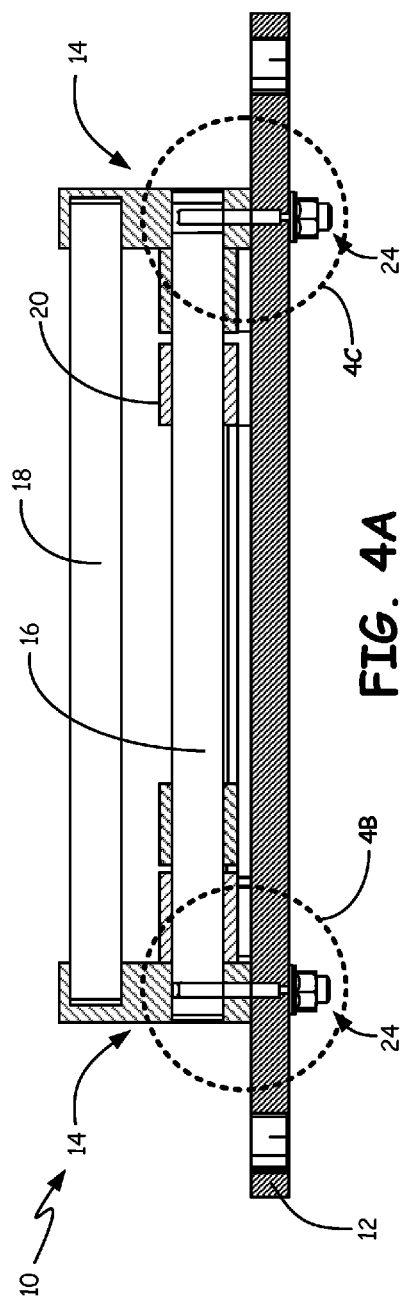
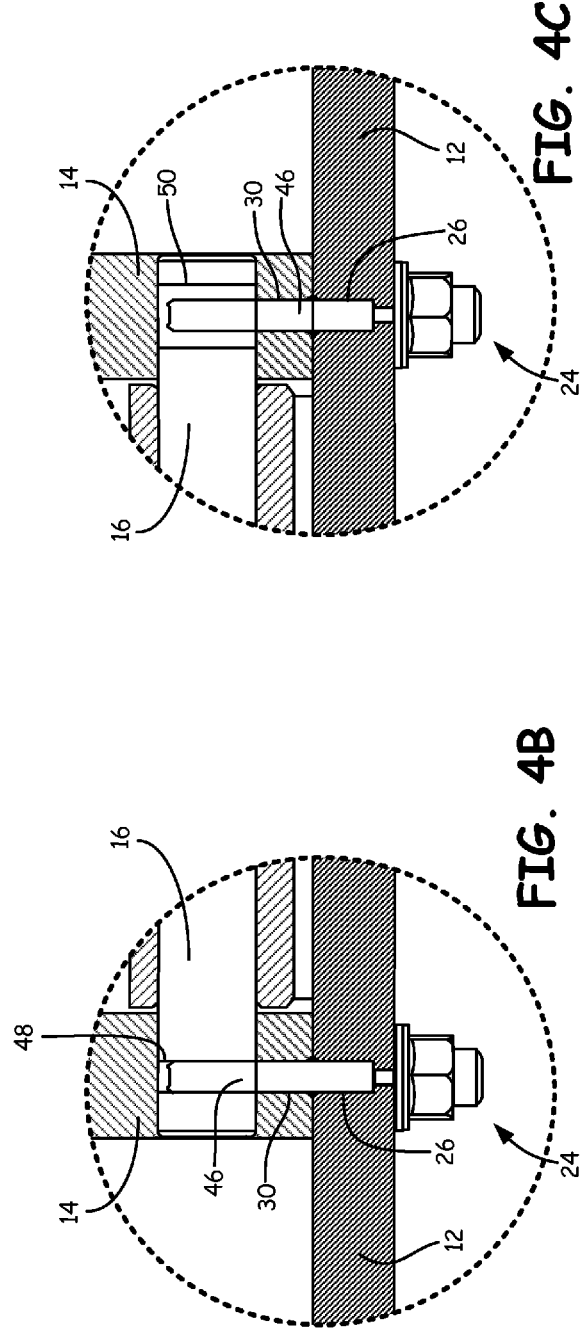

VALVE WITH PRECISION MOUNTED HINGE PIN POSTS

BACKGROUND

The subject matter disclosed herein relates to valves and, more particularly, to the attachment of hinge pin posts to a valve housing.

Flapper valves, including dual flapper valves, utilize hinge pins, which are mounted on posts for rotation of the flappers. The precision and methodology used in mounting and locating the hinge pin is critical for proper operation and longevity of the valve. In general, there are two approaches for creating the mounting features for the hinge pin: integral and non-integral posts. For integral posts, the valve housing and the posts are formed together, typically by machining. With non-integral posts, the valve housing and the posts are formed separately and then joined together, typically with one or more fasteners.

SUMMARY

A valve includes a housing with a flow passage and a hole extending into the housing; a post with a base and a hole extending into the base, the post connected to the housing; and a dowel pin which sits in the hole of the housing and extends into the hole in the post.

A method of assembling a flapper valve includes press fitting a dowel pin into a hole in a valve housing; aligning a post with a hole in the base so that the dowel pin extends into the hole in the post base; and securing the post to the valve housing with a fastener.

BRIEF DESCRIPTION OF THE DRAWINGS

FIG. 1B is a cross-sectional view of the flapper valve of FIG. 1A along line B-B.

FIG. 1C is a close-up view of a portion of FIG. 1B

FIG. 2A is cross-sectional view of a second embodiment of a flapper valve.

FIG. 2B is a close-up view of section 2B of FIG. 2A.

FIG. 2C is a close-up view of section 2C of FIG. 2A.

FIG. 3A is cross-sectional view of a third embodiment of a flapper valve.

FIG. 3B is a close-up view of section 3B of FIG. 3A.

FIG. 3C is a close-up view of section 3C of FIG. 3A.

FIG. 4A is cross-sectional view of a fourth embodiment of a flapper valve.

FIG. 4B is a close-up view of section 4B of FIG. 4A.

FIG. 4C is a close-up view of section 4C of FIG. 4A.

DETAILED DESCRIPTION

Figure 1A:
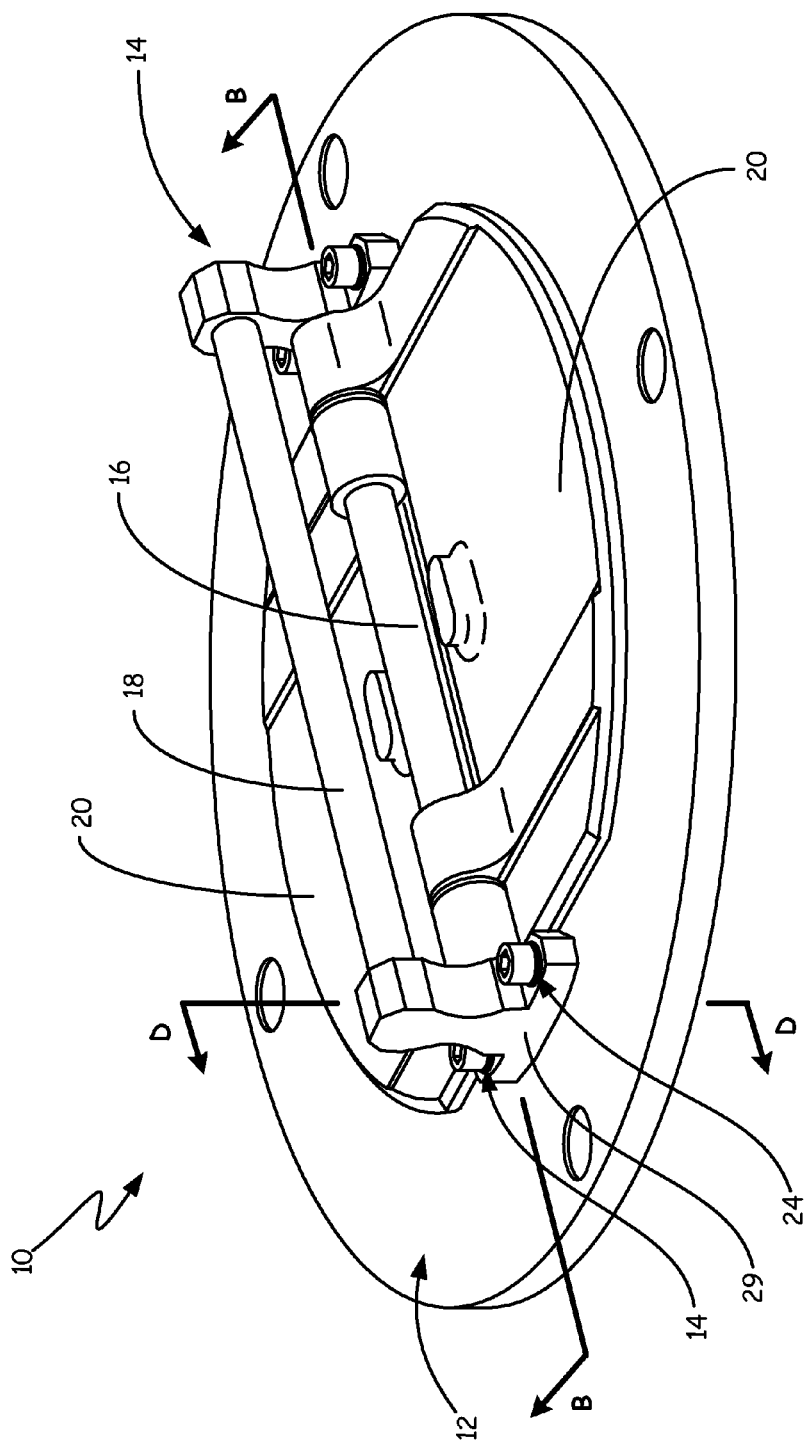
FIG. 1A is a perspective view of one embodiment of a flapper valve.
Figure 1D:
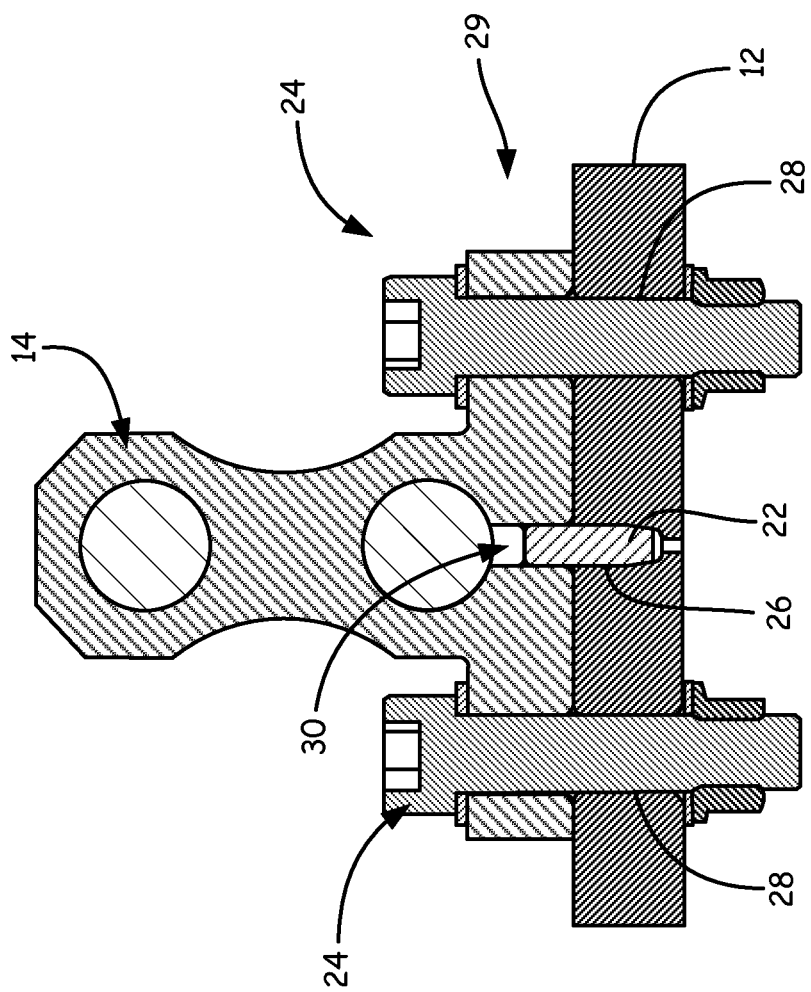
FIG. 1D is a cross-sectional view of the flapper valve of FIG. 1A along line D-D.

FIG. 1A is a perspective view of one embodiment of flapper valve 10, FIG. 1B is a cross-sectional view of flapper valve 10 along line B-B, FIG. 1C is a close-up view of a portion of flapper valve 10, and FIG. 1D is a cross-sectional view of flapper valve 10 along line D-D.

Flapper valve 10 includes valve housing 12, posts 14, hinge pin 16, stop pin 18, flappers 20, dowel pins 22, and fasteners 24. In this embodiment, valve housing 12 includes two bores (which are not shown as they are covered by flappers 20 in FIGS. 1A-1B) and two holes 26 which extend into housing 12, and four bores 28 which extend through housing 12. Each post 14 includes a base 29 and a hole 30 which extends into post 14 at base 29. In the embodiment shown, fasteners 24 are bolts with self-locking nuts, though they can be other types of fasteners in other embodiments. For simplicity, pins are shown without cross-hatching.

Dowel pins 22 sit in holes 26, and can be press-fit into valve housing 12. Hinge pin 16 and stop pin 18 extend through flappers 20, so that flappers 20 can rotate relative to hinge pin 16. Hinge pin 16 and stop pin 18 fit into posts 14 on each end. Posts 14 connect to housing 12 by aligning so that dowel pins 22 extend into holes 30. Posts 14 can be slip fit onto dowel pins 22, and then fasteners 24 can be used to secure posts 14 to housing 12. Once posts 14 have been secured to housing 12, flappers 20 can selectively rotate around hinge pin 16 to selectively restrict or allow flow through valve 10.

As can be seen in FIG. 1D, dowel pin 22 is cylindrical in shape and can be chamfered on one or both ends, which can help engagement with hole 30, hinge pin 16 and/or hole 26. Dowel pin 22 can be made of steel, stainless steel or any other material depending on valve 10 requirements. Dowel pins 22 typically extend in length at least one and a half times a diameter of dowel pin 22 into each of housing 12 and post 14. For example, dowel pin 22 may extend twice its diameter in length into housing 12 and one and a half times its diameter in length into post 14. The extension of dowel pins 22 into both posts 14 and housing 12 can vary depending on structural loads on posts 14.

By using dowel pin 22, which extends from hole 26 in housing 12 into hole 30 in post 14, valve 10 is able to use non-integral posts while maintaining precise post 14 location for holding hinge pin 16 to maintain proper operation and longevity of valve 10. As mentioned above, valve 10 could typically be made with either integral or non-integral posts. Integral posts require much more material and can be quite difficult to manufacture due to the shape of the housing 12 and posts 14. Thus, making posts 14 non-integral to housing 12 can save manufacturing materials and costs, but a significant disadvantage of non-integral posts is that the location and fit of hinge pin 16 ends up being less precise as compared to integrally machined posts. This can be due to the mounting of the posts, for example, screw fasteners can cause the posts to be slightly skewed. By using dowel pin 22, which can be press fit into housing 12, posts 14 can be precisely aligned so that dowel pin extends into hole 30. This greatly mitigates the disadvantages of using non-integral posts 22 in valve 10, and can further provide shear capability and therefore better structural integrity of valve 10, as fasteners 24 are typically not designed to be put under a shear load.

Using dowel pin 22 to connect posts 14 to housing 12 allows for a relatively simple, inexpensive and robust system for hinge pin 16 retention and allows for valve 10 to acquire the benefits of using non-integral posts 14. Manufacturing posts 14 non-integral to housing 12 can allow for posts 14 and housing 12 to be made of different materials, for example, lower weight aluminum housing 12 and higher wear stainless steel posts 14, for system optimization depending on needs. Using non-integral posts 14 can allow for better repairability and maintainability of valve 10, as posts 14 can be replaced instead of having to replace entire valve housing 12 and posts 14 (as in integral system).

FIG. 2A is cross-sectional view of a second embodiment of a flapper valve 10 and FIG. 2B is a close-up view of section 2B of FIG. 2A, and FIG. 2C is a close-up view of section 2C of FIG. 2A. Valve 10 includes housing 12 (with holes 26), posts 14 (with holes 30), hinge pin 16, stop pin 18, flappers 20, dowel pins 32, and fasteners 24. In this embodiment, hinge pin 16 includes bore 34 and bore 36 extending into hinge pin 16.

Valve 10 operates in the same manner as valve 10 of FIGS. 1A-1D. However, in the embodiment of FIGS. 2A-2C, dowel pin 32 extends into bore 34 of hinge pin 16 and dowel pin 32 extends into bore 36 of hinge pin 16. The chamfered end of dowel pins 32 engage bores 34, 36. Bore 34 can be shaped with a diameter just larger than the diameter of dowel pin 32 to securely fit with dowel pin 32. Bore 36 has a larger diameter than dowel pin 32 to allow for thermal expansion, particularly when using different materials for different parts of valve 10. In other embodiments, both bores 34, 36 could be larger or neither bore 34, 36 could be larger.

By extending dowel pins 32 into bores 34, 36 in hinge pin 16, dowel pins 32 can help to retain hinge pin 16 axially, preventing any sliding movement of hinge pin 16 within posts 14. As in FIGS. 1A-1D, dowel pin 32 allows for the use of non-integral posts while maintaining precise post 14 location for holding hinge pin 16. Dowel pin 32 further extends into bores 34, 36 to provide additional support for maintaining axial location of hinge pin 16, thereby maintaining proper operation and longevity of valve 10.

FIG. 3A is cross-sectional view of a third embodiment of flapper valve 10, FIG. 3B is a close-up view of section 3B of FIG. 3A, and FIG. 3C is a close-up view of section 3C of FIG. 3A. Valve 10 includes housing 12 (with hole 26), posts 14 (with hole 30), hinge pin 16, stop pin 18, flappers 20, dowel pin 40, and fasteners 24. In this embodiment, hinge pin 16 includes circumferential grooves 42, 44 extending into hinge pin 16.

In the embodiment of FIGS. 3A-3C, dowel pin 40 is flat on one end and spherical on the other end. Circumferential groove 42 is shaped to be complementary in shape to the spherical end of dowel pin 40. Circumferential groove 44 is larger than circumferential groove 42 to accommodate thermal expansion of 10 valve components. In other embodiments, both circumferential grooves 42 and 44 could be larger or neither circumferential grooves 42 and 44 could be larger.

By using dowel pin 40 with spherical end and circumferential grooves 42, 44, dowel pin 40 axially retains hinge pins 16, and can provide for an easier assembly of valve 10, as the rotation of hinge pin 16 would not need to be precise when setting posts 14 (with hinge pin 16) on dowel pins 40.

FIG. 4A is cross-sectional view of a fourth embodiment of flapper valve 10, FIG. 4B is a close-up view of section 4B of FIG. 4A, and FIG. 4C is a close-up view of section 4C of FIG. 4A. Valve 10 includes housing 12 (with hole 26), posts 14 (with hole 30), hinge pin 16, stop pin 18, flappers 20, dowel pin 46, and fasteners 24. In this embodiment, hinge pin 16 includes bores 48 and 50 extending through hinge pin 16.

In the embodiment of FIGS. 4A-4C, bores 48 and 50 extend all of the way through hinge pin 16. Bore 48 is shaped to be a close fit with the outer circumference of dowel pin 46, and bore 50 is larger to accommodate thermal expansion. As in other embodiments, dimensions and sizing of bores 48, 50 can be different. Dowel pins 46 are of a length to extend most or all of the way through bores 48, 50.

Dowel pins 46 can help in both the precise location of posts 14, and can also provide axial retention of hinge pin 16 by extending through bores 48, 50. Additionally, extending bores 48, 50 all the way through hinge pin 16 may make them easier and less expensive for manufacturing.

In summary, by using dowel pins 22, 32, 40, 46 to extend between valve housing 12 and posts 14, non-integral posts can be used for valve 10 while maintaining proper post 14 and therefore hinge pin 16 position. This can help to increase life of valve and add shear strength to connection between posts 14 and housing 12, as well as allow for the other benefits which flow from using non-integral posts, for example, the ability to optimize materials used, savings in manufacturing materials and costs, better repairability and maintainability of parts, and the ability to use common posts across similar sized valves 10 which can enable modular valve design. All of these can result in an overall increase in the life and durability of valve 10.

While FIGS. 1A-4C show flapper valve 10, this is for example purposes only, and other types of valves could use non-integral posts with one or more dowel pins, for example, butterfly valves.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve comprising:
   a housing with a flow passage and a hole extending into the housing;
   a post non-integral with the housing, the post having a base, a hinge pin opening, and a hole extending into the base from the hinge pin opening, the post connected to the housing;
   a hinge pin at least partially within the hinge pin opening; and
   a dowel pin which sits in the hole of the housing and extends through the hole in the post into the hinge pin opening,
   wherein the hinge pin has a completely circumferential groove to receive the dowel pin.

2. The valve of claim 1, wherein the dowel pin is press fit into the hole in the housing.

3. The valve of claim 1, wherein the dowel pin is chamfered on at least one end.

4. The valve of claim 1, further comprising:
   one or more fasteners to connect the post to the housing.

5. The valve of claim 4, wherein the one or more fasteners are adjacent to the dowel pin.

6. The valve of claim 1, wherein the hinge pin includes a bore for the dowel pin to extend at least part way through the hinge pin.

7. The valve of claim 6, wherein the bore in the hinge pin is larger in diameter than the dowel pin such that a gap is present between the hinge pin and the dowel pin so the gap is able to accommodate thermal expansion.

8. The valve of claim 1, wherein the dowel pin has a rounded end to fit in the circumferential groove.

9. A valve comprising:
   a valve housing with a bore defining a flow passage;
   first and second posts which are non-integral with and connect to the valve housing, the first post including a first hinge pin opening and a first hole extending from the first hinge pin opening to the valve housing, the second post including a second hinge pin opening and a second hole extending from the second hinge pin opening to the valve housing;
   a hinge pin extending between the first and second posts with one end of the hinge pin being within the first hinge pin opening and another end of the hinge pin being within the second hinge pin opening;

a flapper connected to the hinge pin, the flapper being rotatable around the hinge pin to selectively cover the bore or allow flow through the bore;

a first dowel pin sitting in the first hole to align the first post with the valve housing;

a second dowel pin sitting in the second hole to align the second post with the valve housing;

a hinge pin bore in the hinge pin for at least one of the first dowel pin and the second dowel pin to extend at least part way through the hinge pin, the hinge pin bore having a diameter that is larger than a diameter of the dowel pin such that a gap is present between the hinge pin and the dowel pin so the gap is able to accommodate thermal expansion; and one or more fasteners to connect the first and second posts to the valve housing.

10. The valve of claim 9, wherein the first dowel pin and the second dowel pin are press fit into corresponding first and second holes in the valve housing.

11. The valve of claim 9, wherein the first and second dowel pins are each chamfered on at least one end.

12. The valve of claim 9, wherein the hinge pin has at least one completely circumferential groove to receive at least one of the first dowel pin and the second dowel pin.

13. The valve of claim 12, wherein an end of the at least one of the first dowel pin and the second dowel pin is shaped to be complementary in shape to the at least one circumferential groove.

14. A method of assembling a flapper valve, the method comprising:

press fitting a dowel pin into a hole in a valve housing;

aligning a post having a base, a hinge pin opening, and a hole that extends from the valve housing to the hinge pin opening so that the dowel pin extends into the hole with the dowel pin extending at least partially into a bore within a hinge pin that sits in the hinge pin opening, the bore being larger in diameter than a diameter of the dowel pin to form a gap between the hinge pin and the dowel pin to accommodate thermal expansion; and securing the post to the valve housing with a fastener.

\* \* \* \* \*